(12) United States Patent
Aizawa et al.

(10) Patent No.: US 6,486,912 B1
(45) Date of Patent: Nov. 26, 2002

(54) IMAGE SENSOR WITH SAMPLING CONTROL SYSTEM

(75) Inventors: Kiyoharu Aizawa, Tokyo (JP); Yasuhiro Ohtsuka, Chiba (JP)

(73) Assignee: The University of Tokyo, Tokyo (JP)

( * ) Notice: Subject to any disclaimer, the term of this patent is extended or adjusted under 35 U.S.C. 154(b) by 0 days.

(21) Appl. No.: 09/156,485

(22) Filed: Sep. 18, 1998

(30) Foreign Application Priority Data

Mar. 19, 1998 (JP) .......................................... 10-069994

(51) Int. Cl.[7] .............................................. H04N 5/335
(52) U.S. Cl. ...................... 348/308; 348/304; 250/208.1
(58) Field of Search ................................. 348/207, 294, 348/302, 303, 304, 308, 305, 320–324; 250/208.1; 257/231, 230; H04N 5/335

(56) References Cited

U.S. PATENT DOCUMENTS

| | | | | |
|---|---|---|---|---|
| 5,717,458 A | * | 2/1998 | Yonemoto | .................... 348/305 |
| 5,861,620 A | * | 1/1999 | Takahashi et al. | ........ 250/208.1 |
| 6,147,338 A | * | 11/2000 | Takahashi | ................ 250/208.1 |

FOREIGN PATENT DOCUMENTS

JP          9-200629        7/1997

* cited by examiner

Primary Examiner—Tuan Ho
(74) Attorney, Agent, or Firm—Venable; Robert J. Frank

(57) ABSTRACT

An image sensor with sampling control system including a sensor unit 1 having a number of pixel circuits arranged in matrix, a memory unit 2 having a number of memory circuits 12 arranged in matrix, each memory circuits being corresponding to respective pixel circuits, a first horizontal shift register 9 writing a pixel read-out pattern into said memory circuits in accordance with an externally supplied sample selection signal, a first vertical shift register 8 for generating signals for writing and reading said pixel read-out pattern into and out of said memory circuits, a second vertical shift register 7 driven in synchronism with said first vertical shift register 8 for supplying a pixel value read-out signal to said pixels circuits, a second horizontal shift register 3 for outputting pixel values selected in accordance with the pixel read-out pattern, a third horizontal shift register 4 for outputting all pixel values, and a switch unit 6 for selectively reading the pixel values out of any one of said second and third horizontal shift registers in accordance with a node signal.

10 Claims, 7 Drawing Sheets

FIG_3
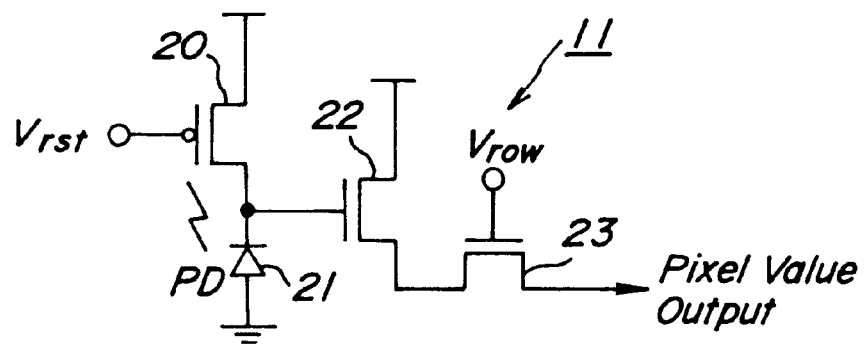
FIG_4
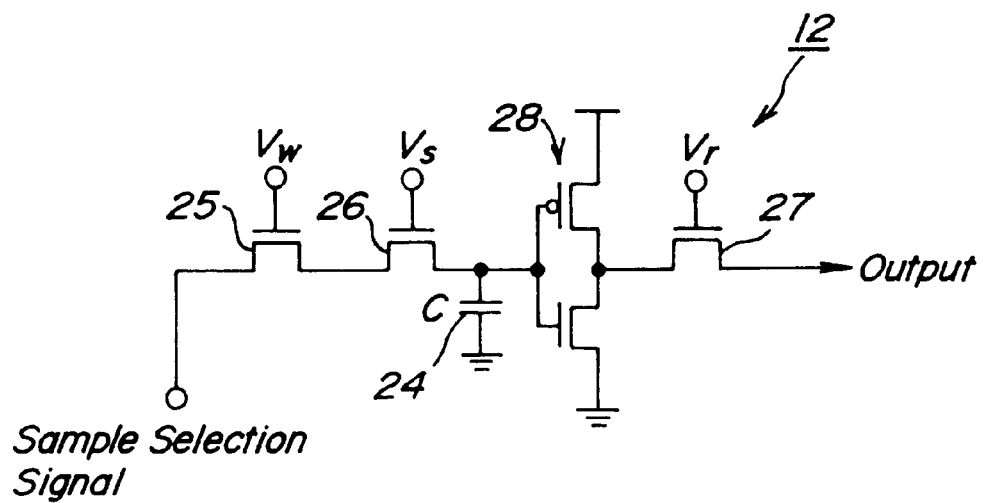

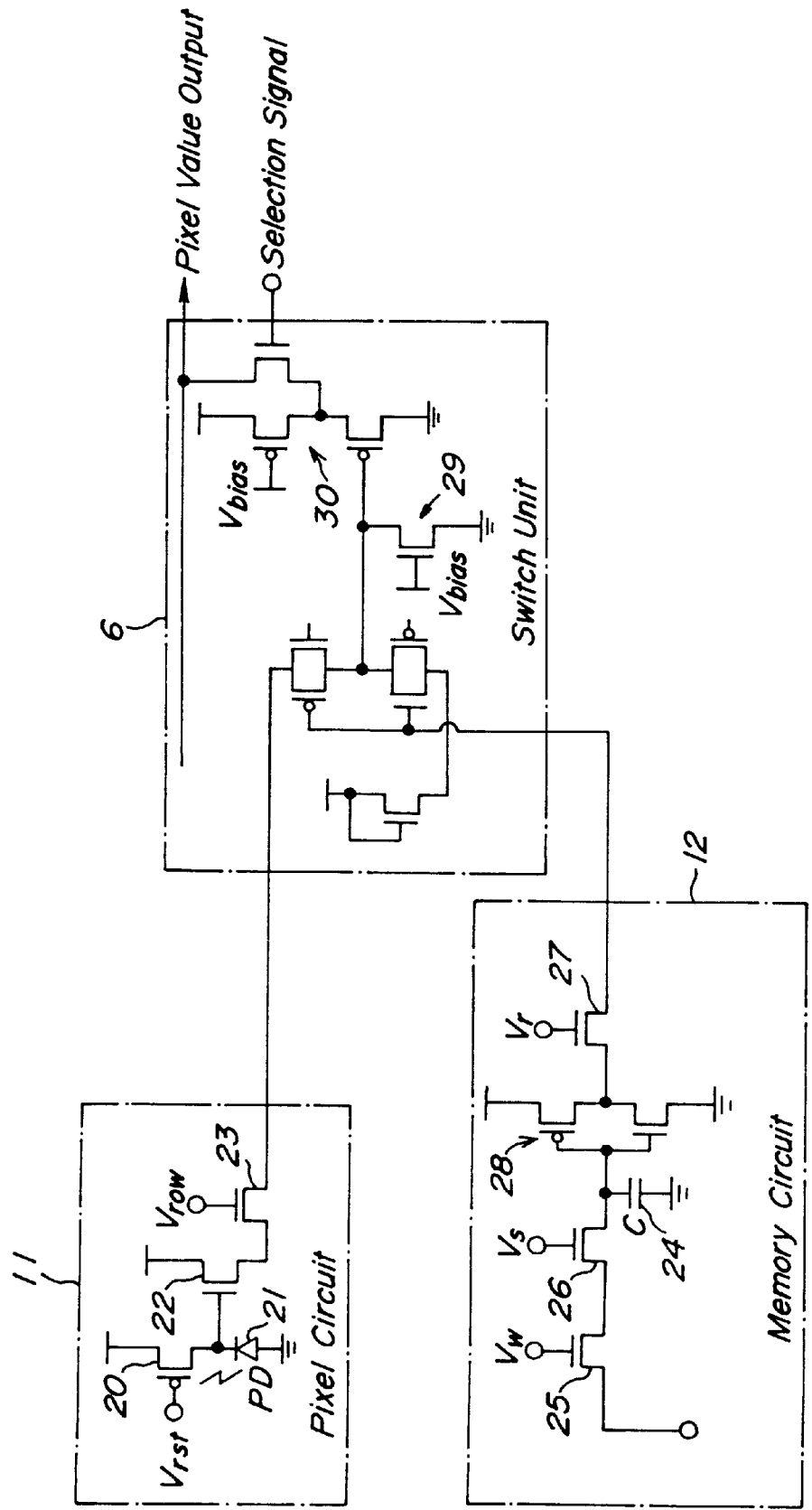
FIG_5

FIG_6
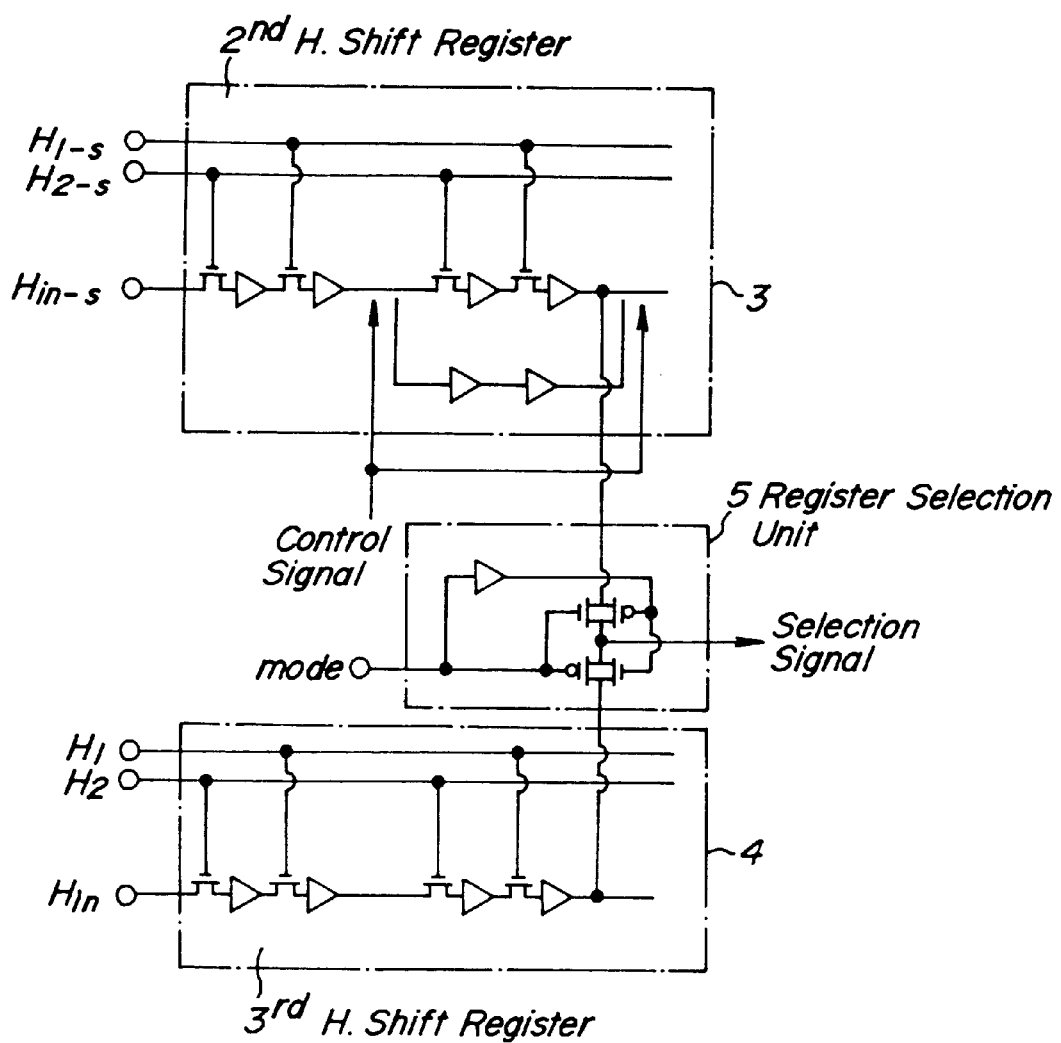

FIG_8
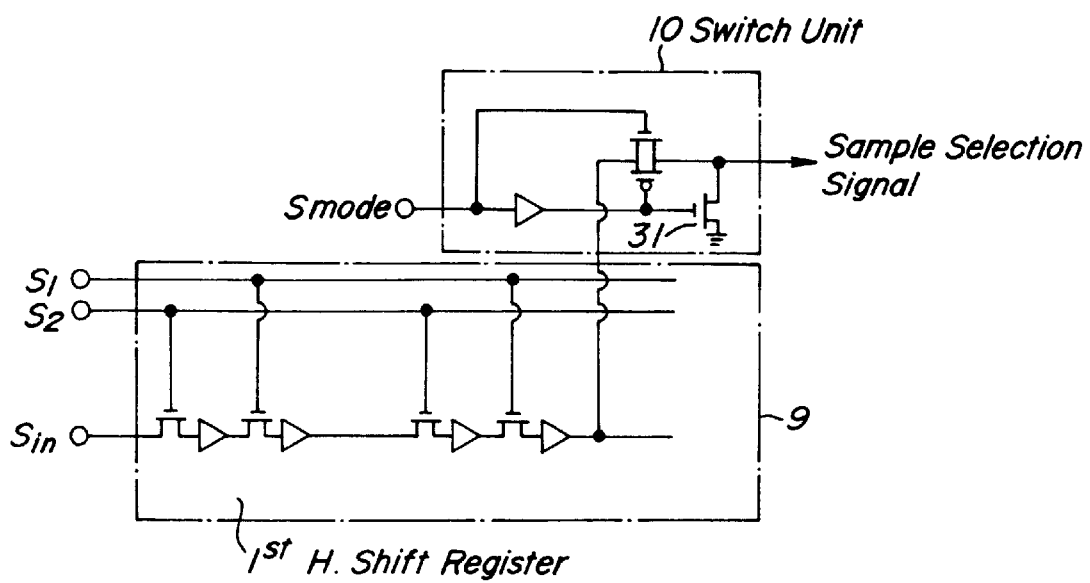

IMAGE SENSOR WITH SAMPLING CONTROL SYSTEM

BACKGROUND OF THE INVENTION

1. Field of the Invention

The present invention relates to an image sensor with signal processing system, and more particularly to an image sensor with sampling control system. Such an image sensor with sampling control system may be advantageously applied to a field of developing a robot vision system as well as a field of image measurement.

2. Description of the Related Art

In general, in an image processing system an image is picked-up by an image acquisition device such as a CCD camera to derive an analog image signal, and after converting the analog image signal into a digital image signal by an analog-digital converter, the thus converted digital image signal is supplied to a digital image processing device. In order to increase an image processing speed, these devices have been designed to have high operating speed. However, since the image signal outputted from the image acquisition device is a serial signal, the overall processing speed is limited. In HDTV, a high speed operation is realized by deriving the image signal by means of two pixel read-out lines.

On the other hand, in accordance with a progress in VLSI technology, it has become possible to arrange various peripheral circuits around an image sensing unit on a single semiconductor chip. There have been proposed image sensors with various image processing systems. Such image sensor is called a computational image sensor or smart image sensor, in which an image sensing section and an image processing section are formed on a same semiconductor chip.

Heretofore, there have been proposed an image sensor with random access system, an image sensor with skip access system, an image sensor with block address system and a polar coordinate type image sensor.

FIG. 1 is a block diagram showing a known typical image sensor with random access system. This image sensor includes an imaging cell array 51, a row decoder 52, a column decoder 53, a column selector 54 and an output section 55, all of these components being formed on a single semiconductor chip. In this known image sensor, coordinates of pixels within a given block on the imaging cell array 51 are denoted from an external with a unit of row and column. That is to say, an input value r from the row decoder 52 and an input value c from the column decoder 53 are converted into coordinates, and a pixel value of the denoted coordinates is selectively read-out. In this known image sensor, respective pixels of the imaging cell array 51 have to be accessed, and thus address information is always required for performing the random access.

Also in the known image sensor with block access control system as well as in the known image sensor with skip access control system, the read-out of the image signal is performed principally in accordance with the access with a unit of row and column. Therefore, by inputting row and column addresses, a pixel value of a pixel at denoted row and column can be deleted or selected, and an image signal can be selectively read out of a desired block on the imaging cell array. Furthermore, by performing a sub-sampling for pixel array, a size of an output image can be reduced. However, in these image sensors, pixel values could not be read out of a smaller area than the block denoted by the row and column information.

In the polar coordinate type image sensor, a central portion and a peripheral portion of the image sensing section are formed by imaging cell arrays arranged with different density. That is to say, the central portion is composed of pixels arranged with a higher density and the peripheral portion is composed of roughly arranged pixels. Therefore, it is possible to attain a higher resolution in the central portion than the peripheral portion. In this manner, the polar coordinate type image sensor can resemble a fovea of a human eye. However, since the central and peripheral portions are constructed fixedly, upon unifying this image sensor with a vision system, the image sensor has to be always moved in accordance with a movement of a focus. Furthermore, this image sensor could be used only to an application resembling a fovea of a human eye, and therefore a range of application is limited.

In the above mentioned image sensor with random access system, an image signal can be read out of an arbitrarily selected or denoted pixel or pixels, but this control requires always pixel address information, and thus high speed access could not be realized.

In the image sensor with skip address system as well as in the image sensor with block access system, an image signal can be read out of any desired block denoted on the imaging cell array, but an image signal could not be read out of an area smaller than the block denoted by the row and column information. For instance, a single pixel could be not be selectively read out.

In the polar coordinate type image sensor, since the pixels are arranged in accordance with a fixed pattern resembling a fovea of a human eye, the application is limited.

SUMMARY OF THE INVENTION

The present invention has for its object to provide a novel and useful image sensor with sampling control system, in which access to respective pixels as well as pixels within any desired block can be performed without requiring address information, a control of image resolution can be performed with a pixel unit, and a high speed access can be attained.

It is another object of the invention to provide an image sensor with sampling control system, in which a sampling corresponding a fovea of a human eye can be performed while a focus movement within an image pick-up plane is not required when the image sensor is unified with a vision system, and a versatile sampling can be carried out without being limited to a fovea of a human eye.

According to the invention, an image sensor with sampling control system comprises:

a sensor unit having a number of pixel circuits arranged in matrix;

a memory unit having a number of memory circuits arranged in matrix, the number of said memory circuits being equal to that of said pixel circuits, a first horizontal shift register for writing memory values constituting a pixel read-out pattern into said memory circuits in accordance with a sample selection signal;

a first vertical shift register for generating a signal for writing said memory values into said memory circuits as well as a signal for reading said memory values out of said memory circuits;

a second vertical shift register driven in synchronism with said first vertical shift register to generate a signal for reading out pixel values from said pixel circuits as well as a reset signal to said pixels circuits;

a second horizontal shift register for outputting pixel value or values selected in accordance with the memory values stored in said memory circuits;

a third horizontal shift register for outputting all pixel values; and a switch unit for controlling of read-out of the pixel values from any one of said second and third horizontal shift registers in accordance with the memory values stored in the memory circuits.

In the image sensor with sampling control system according to the invention, all the above mentioned components may be formed on a single semiconductor chip. Furthermore, by suitably selecting said memory values denoting the pixel read-out pattern, any desired sampling can be performed at a high operating speed.

In a preferable embodiment of the image sensor with sampling control system according to the invention, each of said memory circuits of the memory unit includes three NMOS switches, an electrical energy storing element and an inverter.

BRIEF DESCRIPTION OF THE DRAWINGS

FIG. 3 is a circuit diagram illustrating a detailed construction of a pixel circuit of a sensor unit;

FIG. 4 is a circuit diagram depicting a detailed construction of a memory circuit of a memory unit;

FIG. 5 is a circuit diagram illustrating a detailed construction of a switch unit together with the sensor unit and memory unit;

FIG. 6 is a circuit diagram showing a detailed construction of two horizontal shift registers and a register selection unit;

FIG. 8 is a circuit diagram showing a detailed construction of a portion including a horizontal shift register for writing a pixel read-out pattern.

DESCRIPTION OF THE PREFERRED EMBODIMENT

Figure 1:
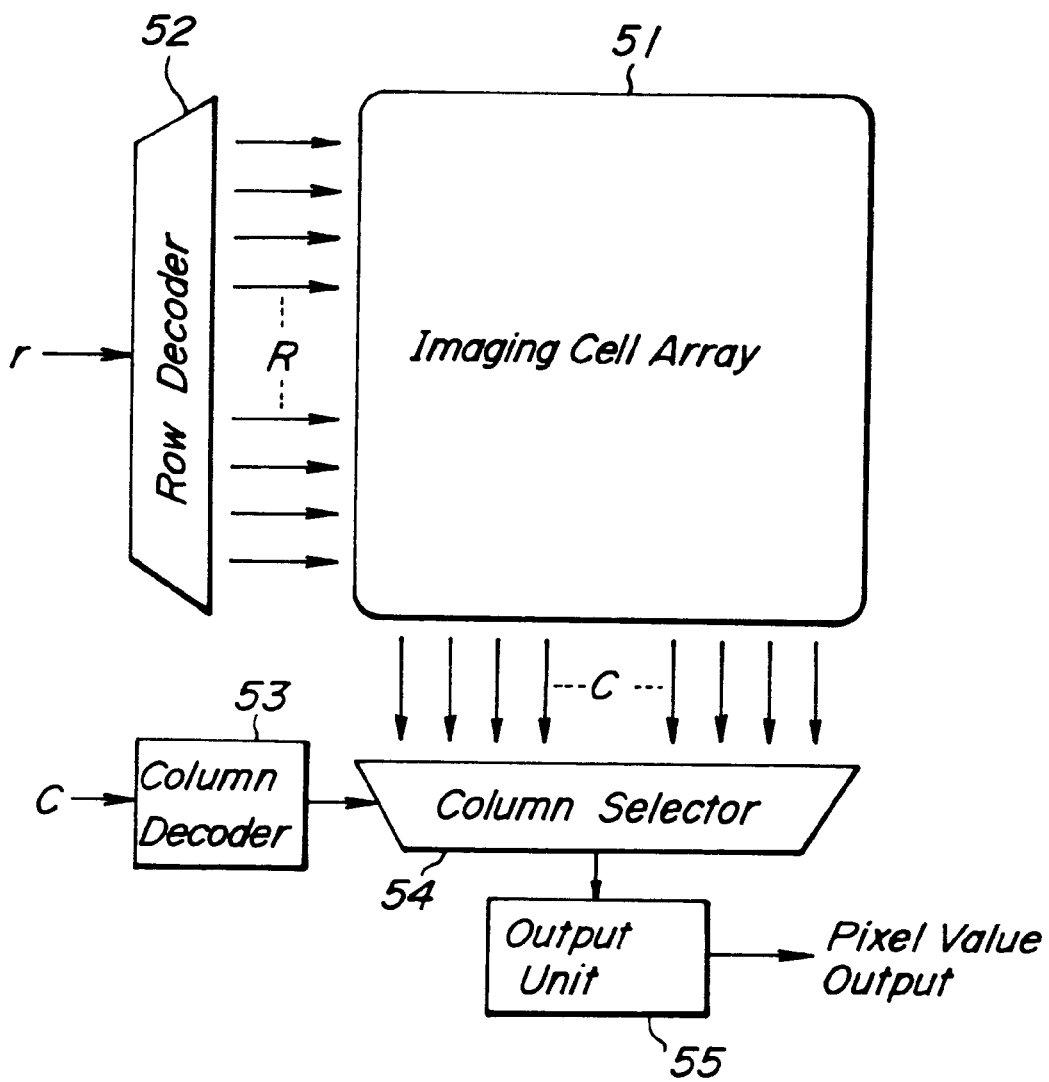
FIG. 1 is a block diagram showing a known image sensor with random access system.
Figure 2:
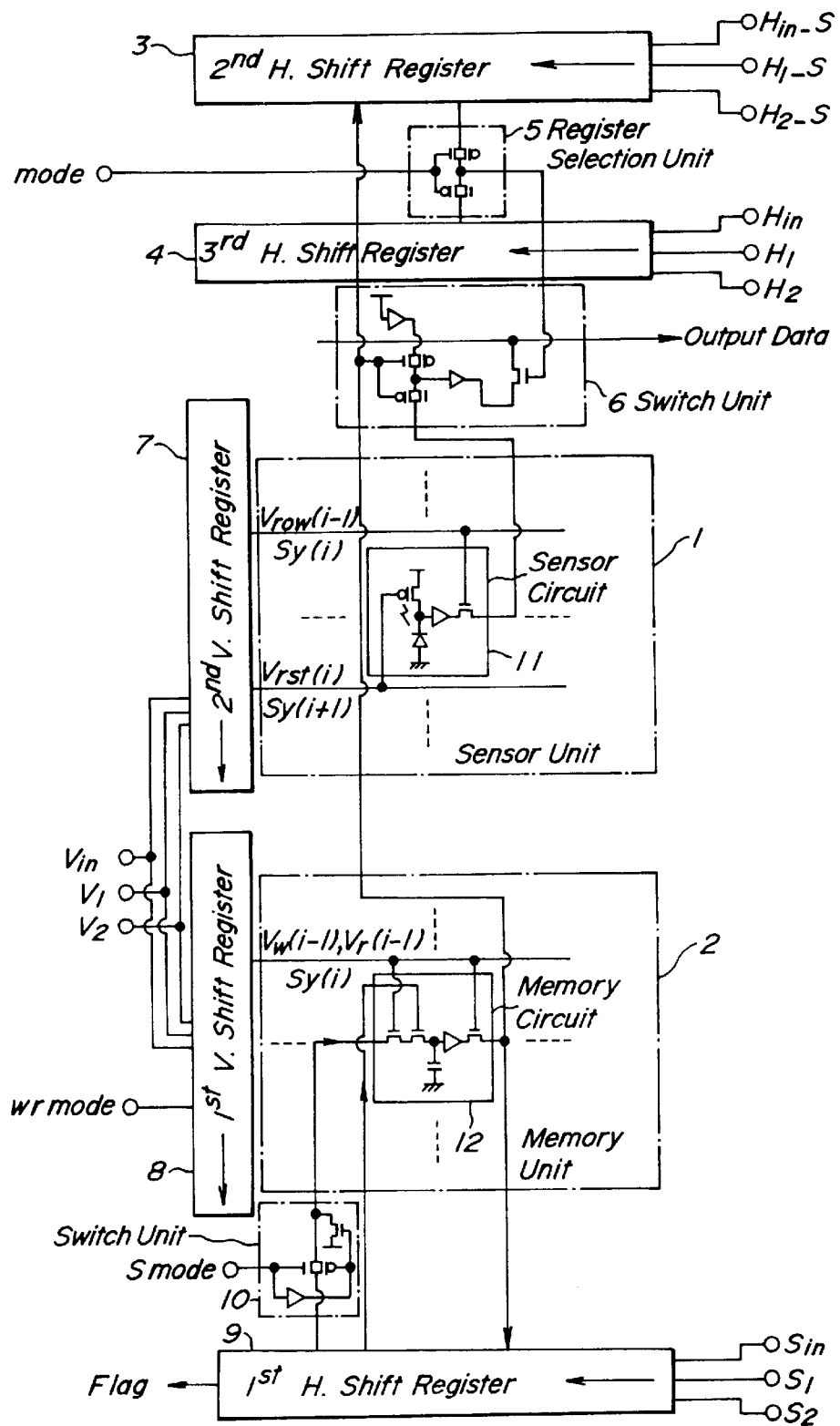
FIG. 2 is a block diagram depicting a construction of an embodiment of the image sensor with sampling control system according to the invention.

FIG. 2 is a block diagram showing an embodiment of the image sensor with sampling control system according to the invention. The image sensor with sampling control system of the present embodiment comprises a sensor unit 1, a memory unit 2, a smart horizontal shift register (second horizontal shift register) 3, a normal horizontal shift register (third horizontal shift register) 4, a register selection unit 5, a switch unit 6, a second vertical shift register 7, a first vertical shift register 8, a lower stage horizontal shift register (first horizontal shift register) 9, and a switch unit 10, The sensor unit 1 includes a number of pixel circuits 11 and the memory unit 2 includes a number of memory circuits 12 whose number is equal to that of the pixel circuits 11. The pixel circuits 11 and memory circuits 12 are arranged in matrix. The sensor unit 1 and memory unit 2 operate independently from each other and each pixel circuits 11 of the sensor unit 1 correspond to respective memory circuits 12 in the memory unit 2.

As stated above, the sensor unit 1 comprises a number of the pixels circuits 11 arranged in matrix. FIG. 3 is a circuit diagram showing a detailed construction of a pixel circuit 11. The pixel circuit 11 comprises a PMOS transistor 20, a photodiode (PD) 21 having a PN junction and a series circuit of two NMOS transistors 22 and 23.

In the pixel circuit 11, the photodiode 21 operates to perform a photoelectric conversion as well as an amplification and a non-destructive read-out of stored electrostatic charge, That is to say, when a reset signal Vrst is applied to the PMOS transistor 20, the PN junction is reverse-biased to store electrostatic charge and a voltage across the photodiode is 5 V. Then, the stored charge is gradually discharged in accordance with incident light, and the voltage across the photodiode 21 is gradually decreased. When a reading-out signal Vrow is applied from the second vertical shift register 7 to the transistor 23 constituting an NMOS switch, the voltage across the photodiode 21 is read-out as a pixel value.

The memory unit 2 comprises a number of the memory circuits 12 arranged in matrix. As shown in FIG. 4, a memory circuit 12 comprises an NMOS switch 25, an NMOS switch 26, a capacitance (electric energy storing element C) 24, and a series circuit of an inverter 28 and an NMOS switch 27.

In the memory circuit 12, the NMOS switch 27 is controlled by a memory value reading-out signal Vr supplied from the first vertical shift register 8, the NMOS switch 25 is controlled by a memory value writing signal Vw also supplied from the first vertical shift register 8, and the NMOS switch 26 is controlled by a lateral selection signal Vs generated by the lower stage horizontal shift register 9. The writing operation to the memory circuit 12 is executed by supplying an S mode signal Smode to the switch unit 10 and the sample selection signal is supplied from the lower stage horizontal shift register 9 to the memory circuit 12.

A memory value of the above mentioned memory circuit 12 is a binary value, and a pixel read-out pattern is determined by a group of memory values. In the memory circuit 12, by arranging the inverter 28 before the NMOS switch 27 serving as a reading-out switch, a decay of the memory value during the reading-out operation can be avoided. It should be noted that the memory constituting the memory circuit 12 may be constructed by the DRAM or SRAM composed of transistors.

In the image sensor of the present embodiment, pixels from which pixel values are to be read-out are denoted by the pixel read-out pattern formed by the memory values stored in the memory circuits 12. Selection of a pixel value is carried out by utilizing an output from a memory circuit 12 as a control signal for the switch unit 6 as shown in FIG. 5, and a pixel value is actually selected only when the memory value is 1. In this case, non-selected pixel values constitute blanks in the normal horizontal shift register 4 which serves as a shift register in a normal mode. In order to avoid such an undesired phenomenon, the output of the photodiode (5 V) which is equal to a value when discharge is not performed by incident light is outputted.

It should be further noted that since the output of the pixel circuit 11 of the sensor unit 1 is supplied only through an upper stage of the NMOS buffer (22 in FIG. 3), a pixel value is floating. Therefore, a selected pixel value is supplied through the lower stage of the NMOS buffer (29 in FIG. 5), and furthermore an direct current component is increased by means of a PMOS buffer 30.

The above mentioned smart horizontal shift register 3 and normal horizontal shift register 4 are used to read-out the pixel values, and are constructed as shown in FIG. 6. The normal horizontal shift register 4 can output all the pixel values in regardless with the pixel selection. The smart horizontal shift register 3 is used in a smart scanning mode and can output only pixel values which are selected in accordance with the memory values stored in the memory circuits 12.

The selection of the above mentioned two horizontal shift registers 3 and 4 is controlled by supplying the selection signal to the switch unit 6 under the control of the register selection unit 5 which receives a mode signal mode from the external. This mode signal mode is a binary signal. When the mode signal is 0, the normal horizontal shift register 4 is selected, and when the mode signal is 1, the smart horizontal shift register 3 is selected. The smart horizontal shift register 3 requires a control signal for skipping the read-out operation. The signals stored in the memory circuits 12 are used as said control signal. Therefore, when a memory values stored in a memory circuit 12 is 1, a pixel value is read out of a corresponding pixel circuit 11, but when a memory value is 0, a corresponding pixel circuit 11 is skipped.

Figure 7:
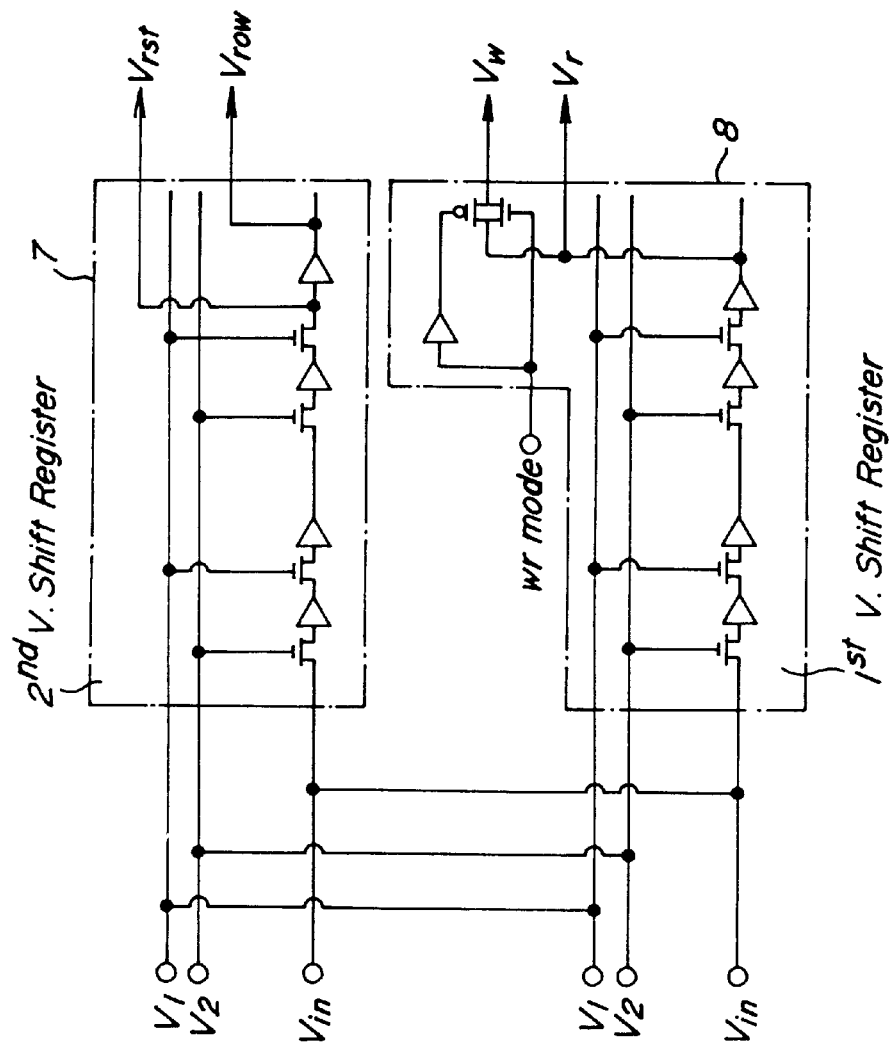
FIG. 7 is a circuit diagram representing a detailed structure of two vertical shift registers.

The second vertical shift register 7 and first vertical shift register 8 are used to control the reading-out of the pixel values and memory values and are constructed as shown in FIG. 7. These vertical shift registers 7 and 8 are provided for the arrays or columns of the sensor unit 1 and memory unit 2, respectively, and are controlled by the same control signal in a synchronized manner.

The vertical shift register 7 arranged for the sensor unit 1 generates the pixel value read-out signal Vrow and the reset signal Vrst for the photodiode in the pixel circuit 11. The reset signal Vrst is supplied to a pixel circuit 11 belonging to a preceding row, and therefore a charge storing period amounts to one frame period. The vertical shift register 8 provided for the memory unit 2 generates the memory value read-out signal Vw and writing signal Vr. Since these signals are independent from each other, only the reading-out may be performed while the writing is stopped. Therefore, the writing mode signal wrmode is a binary signal, and when the mode signal is 1, the writing is performed.

The lower stage horizontal shift register 9 generates the writing signal Vs for the memory unit 2 for forming the writing pattern, and is constructed as illustrated in FIG. 8. When the switch unit 10 receives the S mode signal Smode from the external and supplies a sample selection signal from the lower stage horizontal shift register 9 to the memory circuit 12 of the memory unit 2, the writing to the memory unit 2 is executed. That is to say, when the sample selection signal is 1, the output signal Vs from the lower stage horizontal shift register 9 is transferred to the memory circuit 11, and the memory circuit stores the information of 1. On the other hand, when the sample selection signal is 0, the resetting operation is performed by utilizing an NMOS switch 31 provided in the switch unit 10, and therefore it is not necessary to provide a reset circuit for respective memory circuits.

In the present embodiment, the information stored in the memory unit 2 is outputted from the lower stage horizontal shift register 9 as flag information. This flag information may be used as address information for reconstructing pixel output when only selected pixels are read out.

Now the operation of the image sensor of the present embodiment will be explained.

When the sample selection signal for selecting pixels is supplied to the memory circuit 12, the memory values are stored in given memory circuits 12 as binary data. The memory values stored in the memory circuits 12 are read-out in response to the pixel read-out signal Vr from the vertical shift register 8. The thus read-out memory values are used tp select pixel values read out of corresponding pixel circuits 11 of the sensor unit 1 in a similar manner. That is to say, when a memory value is 1, a corresponding pixel value is selected, but when a memory value is 0, a corresponding pixel value is not selected. Pixel values on a single row selected in this manner are outputted by means of the switch unit 6.

Since the pixel read-out pattern data stored in the memory circuits 12 are remained unchanged, the reading-out of the pixel values can be performed without supplying a new sample selection signal as long as the pixel read-out pattern data is not changed.

The number of the memory circuits 12 is identical with that of the pixel circuits 11, and therefore the pixel read-out operation can be performed in accordance with any desired sampling pattern.

For instance, a size of an output image may be reduced by effecting a sampling with a unit of column and by utilizing the smart horizontal shift register 3 which serves as the read-out skipping shift register. Furthermore, when pixels values within any desired block are to be read out, it is sufficient to store the sample selection signal only to memory circuits 12 within said block. In this case, pixel values outside the block are skipped. In this manner, the pixel values within the block can be selectively read out. Moreover, when all pixel values within a central portion are read out and pixel values outside the central portion are sampled in a radial manner, it is possible to realize the image sensor resembling a fovea of a human eye.

As explained above in detail, in the image sensor with sampling control system according to the invention, by providing the memory unit including a number of memory circuits each corresponding to respective pixel circuits of the sensor unit, it is no more necessary to denote coordinates of selected pixels as has been done in the known image sensor with random access system and a high speed pixel reading-out can be realized by using the horizontal shift register (second horizontal shift register) in the smart scanning mode.

Furthermore, since the selection data stored in the memory circuits of the memory unit can be rewritten at will, the image sensor according to the invention can operate in the block access mode, skip access mode and random access. As a case may be, the pixel reading-out density may be controlled with a unit of respective pixels.

Moreover, in the known polar coordinate type image sensor, since the central portion from which pixels are read-out with a higher density is fixed, such an image sensor could be used only in a limited application. However, in the image sensor according to the present invention, since the central portion can be selected or determined at will, the image sensor may be used in various applications. Particularly, since the central portion corresponding to a fovea of a human eye can be moved freely, when the image sensor is unified with the active vision system, the movement of the image sensor itself can be reduced.

Moreover, the sampling control signal forming the pixel read-out pattern can be controlled by the signal supplied from the external, and therefore when the image sensor is unified with an external system, the sampling control signal may be produced in an active manner. Then, it is possible to track automatically a target moving on an image.

When the image sensor according to the invention is applied to the image measurement, useful image information can be effectively obtained by reading pixel values from necessary pixels.

What is claimed is:

1. An image sensor with sampling control system comprising:
   a sensor unit having a number of pixel circuits arranged in matrix;
   a memory unit having a number of memory circuits arranged in matrix, the number of said memory circuits being equal to that of said pixel circuits;
   a first horizontal shift register for writing memory values constituting a pixel read-out pattern into said memory circuits in accordance with a sample selection signal;
   a first vertical shift register for generating a signal for writing said memory values into said memory circuits as well as a signal for reading said memory values out of said memory circuits;
   a second vertical shift register driven in synchronism with said first vertical shift register to generate a signal for reading out pixel values from said pixel circuits as well as a reset signal to said pixels circuits;
   a second horizontal shift register for outputting pixel value or values selected in accordance with the memory values stored in said memory circuits;
   a third horizontal shift register for outputting all pixel values; and
   a switch unit for controlling read-out of pixel values from any one of said second and third horizontal shift registers in accordance with the memory values stored in said memory circuits.

2. An image sensor according to claim 1, wherein each of said memory circuits comprises a first NMOS switch controlled by said signal for writing the memory values into the memory circuits, a second NMOS switch controlled by a lateral selection signal, a capacitance for storing a memory value, and a series circuit of an inverter and a third NMOS switch controlled by said signal for reading the memory value out of the memory circuit.

3. An image sensor according to claim 1, wherein said memory signal is formed by a binary signal.

4. An image sensor according to claim 3, wherein said switch unit is composed to select a pixel value when a memory value is at one state of the binary signal, and supplies a predetermined pixel value when a memory value is at the other state of the binary signal.

5. An image sensor according to claim 4, wherein said predetermined pixel value has a signal level which is equal to that produced by a pixel circuit upon which no light is made incident.

6. An image sensor according to claim 1, wherein all said units and shift registers are formed on a single semiconductor chip.

7. An image sensor according to claim 2, wherein all said units and shift registers are formed on a single semiconductor chip.

8. An image sensor according to claim 3, wherein all said units and shift registers are formed on a single semiconductor chip.

9. An image sensor according to claim 4, wherein all said units and shift registers are formed on a single semiconductor chip.

10. An image sensor according to claim 5, wherein all said units and shift registers are formed on a single semiconductor chip.

* * * * *